June 30, 1964 W. W. BIRD ETAL 3,139,464
BUILDING CONSTRUCTION
Filed July 22, 1960 7 Sheets-Sheet 1

INVENTORS:
WALTER W. BIRD, PETER A. STROBEL,
DR. PAUL I. RONGVED and DAVID P. ZAMORE
BY: Beau, Brooks, Buckley & Beau,
ATTORNEYS.

June 30, 1964    W. W. BIRD ETAL    3,139,464
BUILDING CONSTRUCTION

Filed July 22, 1960    7 Sheets-Sheet 5

INVENTORS:
WALTER W. BIRD, PETER A. STROBEL,
DR. PAUL I. RONGVED and DAVID P. ZAMORE BY: Beau, Brooks, Buckley & Beau,
ATTORNEYS.

June 30, 1964 W. W. BIRD ETAL 3,139,464
BUILDING CONSTRUCTION
Filed July 22, 1960 7 Sheets-Sheet 6

INVENTORS:
WALTER W. BIRD, PETER A. STROBEL,
DR. PAUL I. RONGVED
and DAVID P. ZAMORE BY: Beau, Brooks, Buckley & Beau,
ATTORNEYS.

INVENTORS:
WALTER W. BIRD, PETER A. STROBEL,
DR. PAUL I. RONGVED and DAVID P. ZAMORE BY: Beau, Brooks, Buckley & Beau,
ATTORNEYS.

United States Patent Office 3,139,464
Patented June 30, 1964

3,139,464
BUILDING CONSTRUCTION
Walter W. Bird, 355 N. Forest Road, Williamsville, N.Y.;
Peter A. Strobel, 735 The Parkway, Mamaroneck, N.Y.;
Paul I. Rongved, 250 E. 39th St., New York, N.Y.; and
David P. Zamore, 181 Union St., Montclair, N.J.
Filed July 22, 1960, Ser. No. 44,645
7 Claims. (Cl. 264—32)

This invention relates to improvements in building construction and more specifically to methods and means for utilizing inflatable envelopes in the fabrication of buildings of concrete or other building materials. In one of its principal aspects, the invention relates to the use of a removable, flexible, inflatable form in combination with a unique stabilizing system comprising a structural member or members arranged in such manner that the resulting structure is of improved stability for the support of the poured or laid concrete.

A primary object of the present invention is, accordingly, to improve the stability of inflated envelopes used in building construction.

Other objects of the present invention are to provide an improved form system for building concrete shell structures in order to greatly reduce the cost of the form work, and economical methods for producing such concrete shell structures.

Another object is to provide an improved form system, the components of which are readily portable and reusable.

Another object of the invention is to provide an improved air-supported form for concrete work which will be of improved versatility and dependability.

Other objects and advantages of the invention will appear from the detailed description hereinbelow and the accompanying drawings.

The use of inflatable forms has heretofore been largely limited to essentially spherically-shaped structures, as only such shapes provide sufficient stability to acceptably support the weight of concrete during forming. Also, the inflation pressure required to support the weight of wet concrete results in much higher fabric loads with prior art arrangements, and has therefore heretofore necessitated use of heavy and relatively costly fabric materials; thus making the form costs prohibitive, especially for larger size structures.

Air inflated members inherently tend to assume generally circular cross-sectional shapes, as this form represents an equilibrium condition. In a spherical structure all elements are circular and the pressure is therefore resisted by equal tension in all circular elements. Distortion of a spherical shape under non-uniform loading is relatively small as the load is at least partially redistributed between different circular elements to achieve an equilibrium condition without excessive distortion. With a cylindrical shape the inflation pressure is resisted by hoop tension in the circular elements, while the pressure against the ends of the cylinder is resisted by tension in the longitudinal direction. Under a uniform loading this shape is relatively stable, but under a non-uniform loading, such as would be encountered in supporting wet concrete, or under wind loads, the shape immediately distorts because on a cylindrical section non-uniform loads can be supported only by distortion, as this is the only way in which equilibrium conditions can be established at every point on the surface. Thus, if such distortion is not limited, the shape of the form will change upon placement of the concrete, and also it may shift under wind loads before the concrete is set. Obviously, a distortable form is not suitable for use with concrete because such forms cannot maintain the required shape and the supported concrete will be subject to cracking during setting. It is because of such factors that use of the inflatable forms for supporting wet concrete has heretofore been practical only with essentially spherically shaped structures.

The present invention in its principal embodiments contemplates use of air-supported forms of flexible sheet materials, in combination with prefabricated structural members formed from lightweight structural elements in a manner such that the inflation pressure stabilizes and pre-stresses the trusses which in turn serve to shape the inflatable form. The form is patterned so as to provide a shell form surface having a general curvature and comprising a plurality of subsidiary arch shaped portions, thereby limiting the fabric loads to relatively small values; thus permitting use of higher inflation pressures such as are required to properly support the weight for example of wet concrete. The structural trusses may become integral parts of the resulting reenforced concrete beams formed after placement of the concrete.

Exemplary forms of the invention are illustrated in the drawing furnished herewithin wherein.

Figure 1:
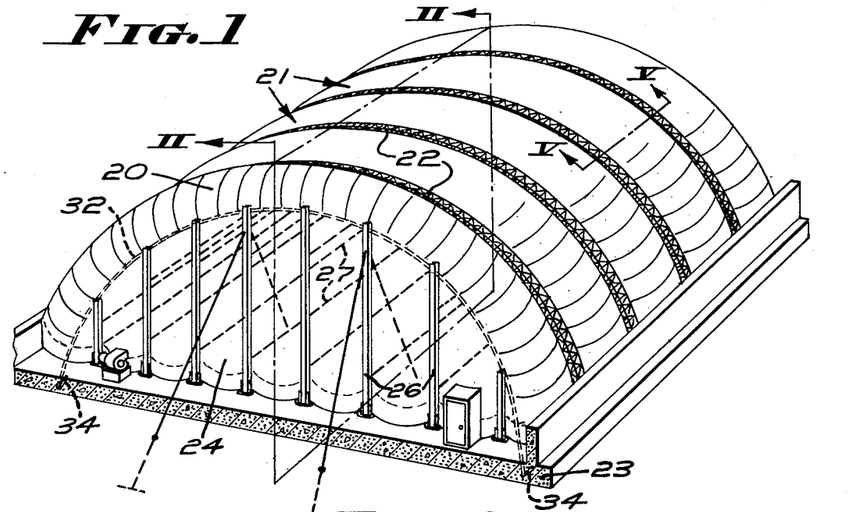
FIG. 1 is a perspective view of a frame-stabilized air-supported form constructed in accordance with the present invention.
Figures 4, 5:
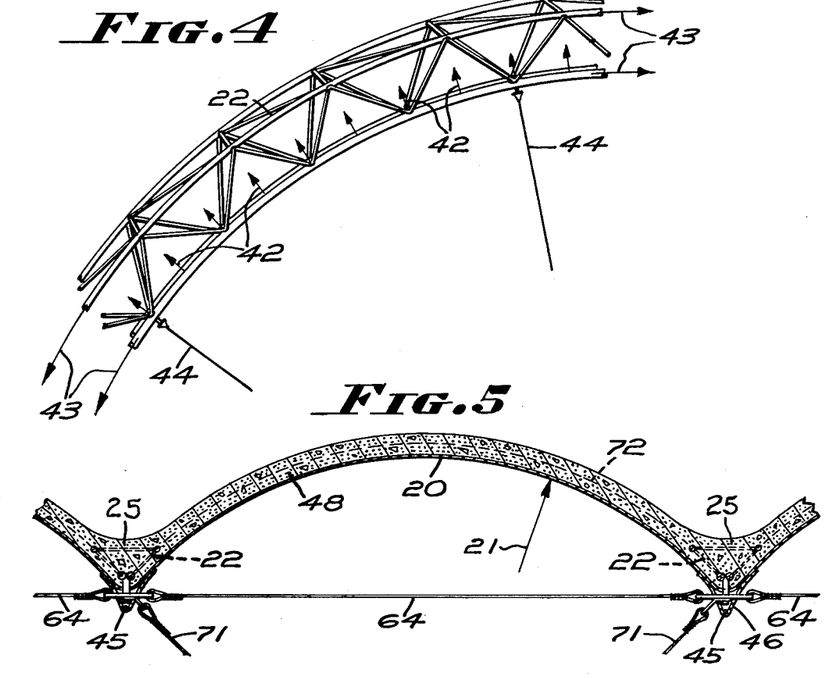
FIG. 4 is a fragmentary side elevational view of one of the structural truss members illustrating the loading of the arch by inflation pressure.
FIG. 5 is a section through the form taken along line V—V in FIG. 1, illustrating in more detail the shape and arrangement of the components, and showing concrete in place.
Figure 10:
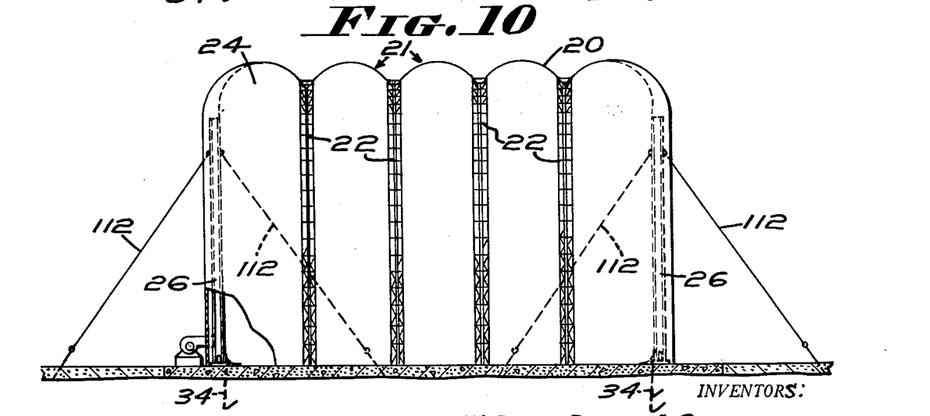

As shown herein by way of example, one form of the present invention as illustrated in FIG. 1 may be constructed to comprise a fabric envelope 20 made of substantially airtight pliable material, such as a coated fabric or plastic film or the like. The envelope is patterned and joined to form barrel-shaped arch sections as indicated at 21 in FIGS. 1, 2 and 10. One or more structural truss members 22 are placed in the valleys formed by the barrel arch sections, and are anchored at their ends into the foundation 23. The shape of the form and relationship between the structural arches 22 and fabric envelope 20 is shown in FIG. 5 which shows the form and concrete shell 48. The form 20 is patterned to provide the desired radius of curvature and is provided with load cables 45 running the length of each valley and fixed to the envelope 20 by means of strips 46. These cables 45 are used to define the barrel-shaped arch sections and position the form 20 prior to placement and attachment of the structural trusses to the envelope. End panels 24 close off the ends of the form 20 to provide an essentially airtight enclosure. In order to support the relatively high inflation pressures required, and to prevent distortion of the form envelope 20, the end panels are reinforced as by beams 26, which are stabilized by tying together opposing beams at opposite ends of the envelope as by means of cables 27; or the panels may be otherwise stabilized to resist the pressure loads. The side and end walls are each equipped with seal skirt portions 29 which lay on the ground (or on a seal diaphragm, if necessary) to provide a reasonably airtight enclosure. In order to shape and position the outer side of the end barrel arch sections C of the form, cables 32 are bonded into each end panel and are joined to anchors 34 at each end.

Figure 2:
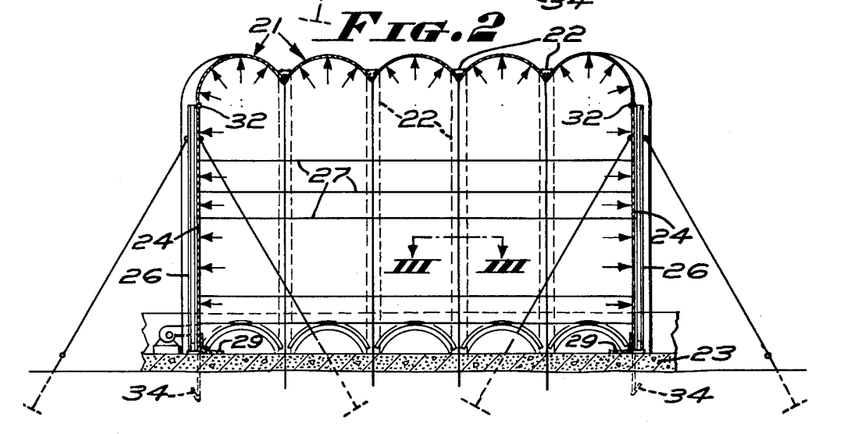
FIG. 2 is a section through the inflated form along lines II—II of FIG. 1, illustrating the distribution of inflation pressure loads.
Figure 3:
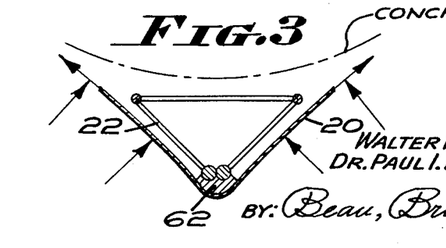
FIG. 3 is a section through one of the trusses taken on line III—III of FIG. 2, showing the loading thereon.

When the form 20 is inflated and the structural trusses 22 are in place and are anchored at their ends to the foundation 23, it assumes the shape approximately as illustrated in FIG. 2. Inflation pressure acting as indicated by arrows in FIG. 2 tensions the barrel arch sections 21 of the form, drawing them up around the structural trusses 22 as shown in FIG. 3. As graphically illustrated in FIG. 4, the fabric tension (arrows 42) in the form envelope is resisted by tension (arrows 43) in the slender truss members. This pretensioning of the trusses increases their resistances to bending and compressive loads, and also ultimately increases the structural efficiency of the reinforced concrete rib 25 which is formed therearound and of which the truss may become a part. The trusses 22 are designed so that when they are pre-tensioned and stabilized by the form 20 they will be capable of supporting in bending the unbalanced loads due to progressive placement of wet concrete, as well as any aerodynamic loads thereon due to wind gusts, etc. Guys as indicated at 44 (FIG. 4) may be employed if desired interiorly of the form to further stabilize the form trusses.

Figure 6:
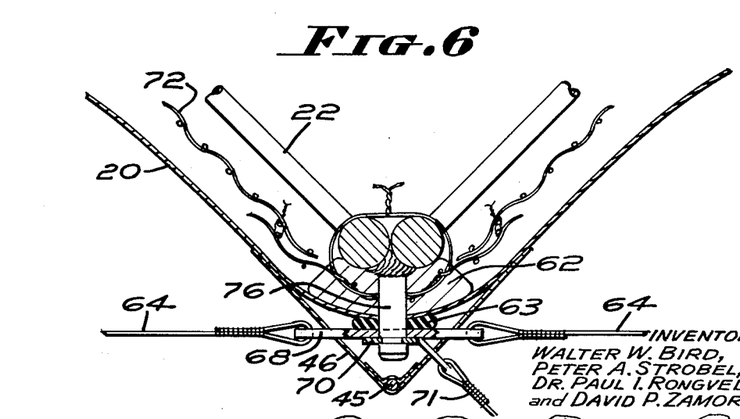
FIG. 6 is an enlarged detailed view of a portion of FIG. 5.

FIG. 6 illustrates the general details of one means for the attachment of the trusses 22 to the fabric 20, and additional stabilizing means. Chairs 62 are used to position the trusses 22 in spaced relation to the fabric form 20. Means such as studs 76 are fastened at intervals along the arch for the purpose of attaching the trusses to the fabric form and to secure the tie cables 64 which space and position the trusses to resist the spreading loads developed during placement of the concrete over the barrel arch sections. The tie cables 64 are joined to the studs 76 by means of attachment plates 68, which are bored to fit over the studs 76. In order to assure a snug, substantially airtight connection through the form, seal rings 63 which fit tight against the studs and are squeezed between the plates 68 and chairs 62 are clamped and held in position by means of locking clips 70 which slip into grooves formed in the studs 76. To facilitate removal of the fabric form from the finished concrete structure, cords as indicated at 71 are conveniently fixed to the clips 70. Concrete reenforcing mesh as indicated at 72 may of course be strategically placed, as is well known in the art.

Figure 7:
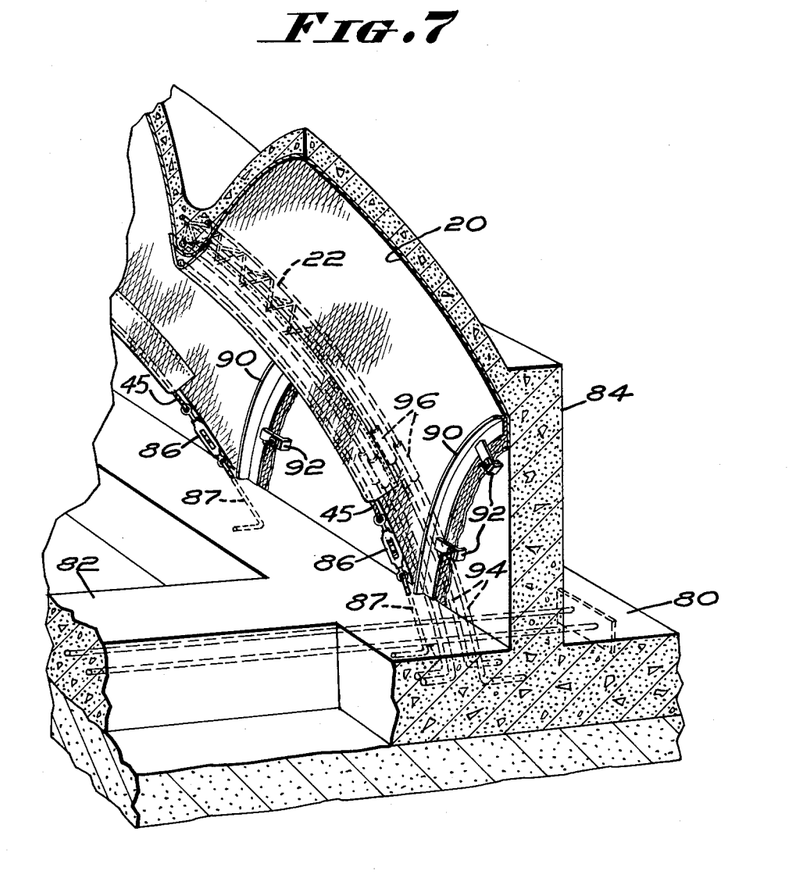
FIG. 7 is a fragmentary perspective view on enlarged scale showing the form and concrete structure at the base of the arch.

FIG. 7 shows a detail of one means of terminating the concrete arch sections at the side walls. In this arrangement footings 80 are provided of a construction suitable to support the weight of the final structure and to provide sufficient resistance to the uploads due to inflation pressure. Cross ties 82 may be used to react the side thrust from the arch members when soil conditions require. Vertical side walls 84 are provided in order to terminate the concrete arch sections. In setting up the form, the cables 45 are attached to the foundation by using an adjustable attachment means such as the turnbuckles 86 and anchor bolts 87. These cables form valleys in the envelope when inflated and support and position the structural arches prior to attachments thereof to the foundation 80. The barrel arch sections of the form 20 terminate against the side wall 84. An arch shaped angle frame 90, which is made to the contour of the barrel arch intersection at the side wall, is clamped up against the side wall to hold the form material securely against the side wall, such as by means of clamps and bolts 92. When the form has been inflated and the arches are lifted up into place, attachments of the trusses to the foundation are made by means of anchor rods 94 provided to extend from the foundation for connection to the trusses by welded or bolted connections as indicated at 96. When these connections are completed, the tensioning on cables 45 are released by slackening off turnbuckles 86, which then allows the pressure to be transferred to the structural arches 22, pretensioning and stabilizing them in preparation for placement of the concrete.

Figure 8:
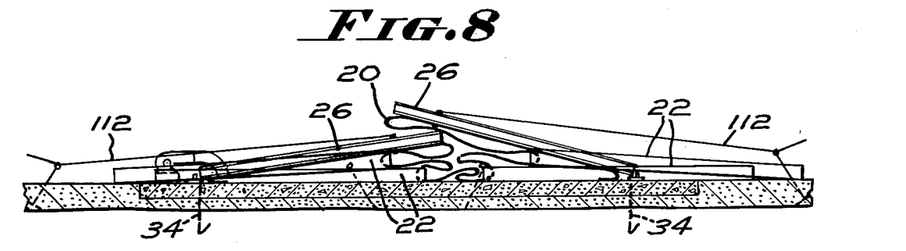
FIGS. 8, 9 and 10 illustrate sequential steps of one method of erecting the form.
Figure 9:
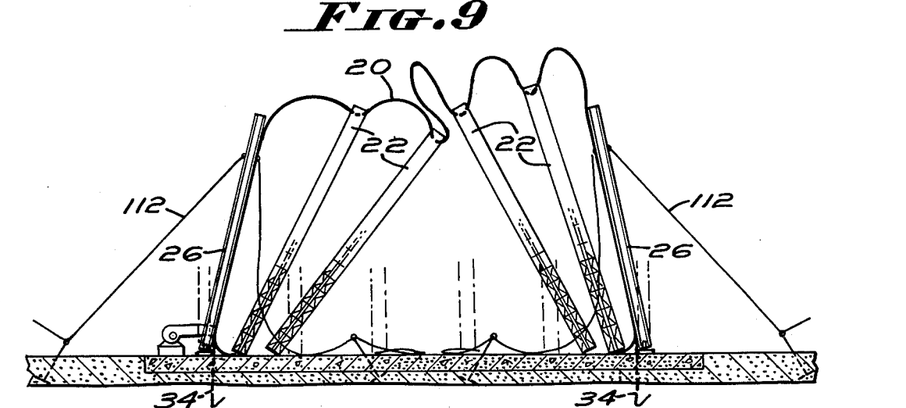
Figures 11, 12:
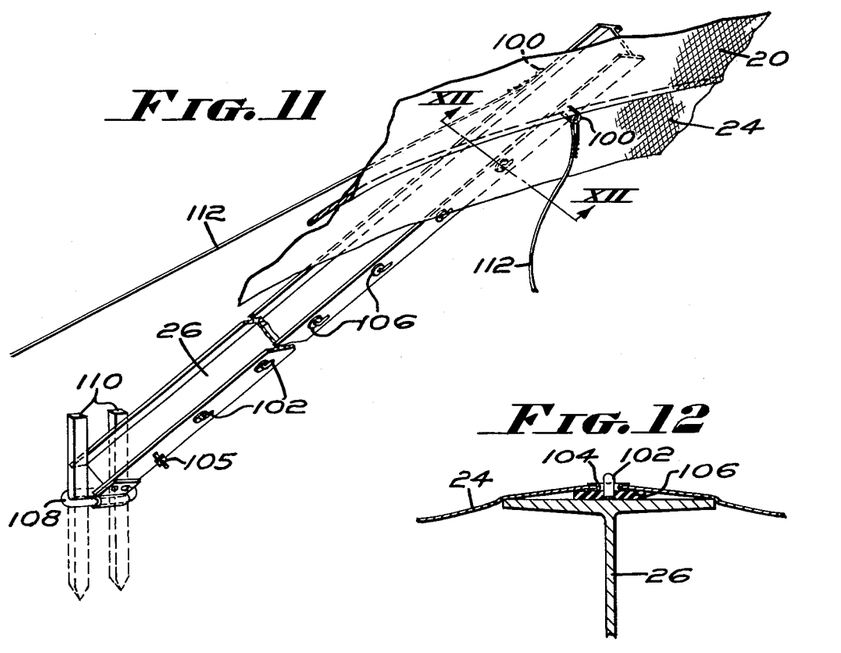
FIG. 11 is a fragmentary section through an end supporting beam illustrating a method of joining the beam to the form and anchoring it to ground.
FIG. 12 is a section on line XII—XII of FIG. 11 illustrating details of the attachment of the form to a supporting beam.

While the inflated form 20 may be erected and positioned prior to placement of the structural arches, which can then be installed by using a crane to lift them up into place, if prefered, the inflated form 20 can be used as a means for lifting the trusses into place without the need for cranes or other heavy equipment. Such an erection technique is illustrated in FIGS. 8–12. Here it will be noted that the inflatable form is laid out and the cable attachments made to the base as previously described and shown in FIG. 7. The end panels are laid out and the positions of the base of each end beam 26 located and staked down as illustrated in FIG. 11. The anchors 34 for attachment of cables 32 are installed and these cables are attached. The beams 26 are then laid in position on the fabric form and are attached to cable 32 (see FIGS. 11 and 12) by means such as a U bolt 100. In order to position the end panels of the form on the beams, the panel is clipped to the beams periodically along their lengths, by means such as hooks 102 welded to the face of the beam, and grommets 104 are inserted into the fabric forms. In order to provide a good air seal, soft rubber washers 106 are used at the hooks so that the tension in the fabric and inflation pressure would press the grommets down against the cushions when inflated. In order to fix the base of the end beams 26 in the proper location, swing links 108 are attached to the base of the beams and stakes 110 are driven into the ground on each side of the beam. This arrangement allows the beam to fold down as illustrated in FIG. 8, yet guides it during inflation into the proper vertical position.

When the form fabric 20 is laid out and securely anchored around the sides by means of cables 45 (FIG. 7) and with the end beams in place, the structural trusses 22 are laid across the form so that they can then be lifted into position without the use of a crane by inflating the form. In order to do this, the fabric is drawn out toward one end, as far as possible. The second from the end truss 22 is laid across the form and attachment is made to the positioning studs 76 as shown on FIG. 6. In making this attachment, seal ring 63 is put in place and the cable attachment plate 68, and locking clip 70 are used to securely anchor the truss to the form. With the fabric deflated, such attachment to the form is made only along approximately the upper ⅔ of the arch. The other three trusses are laid up in overlapping position as illustrated in FIG. 8 and attached to the form in a similar manner. As the form is inflated it would rise as sequentially illustrated in FIGS. 8–10. Guy ropes 112 are used to stabilize the excessive billowing. When pressure is applied it starts to lift the end beams first. The sequence of erection is controlled by maintaining weight on the lower beams until the upper beams have been raised to the desired position. As the form is inflated, the end sections of the structural trusses are swung down into the valleys formed by tension developed on cables 45. The entire assembly is then positioned and stabilized by means of guy wires 112, and the remaining attachment of the envelope to the trusses by means of studs 76 is now conveniently completed.

The form is maintained inflated at relatively low pressure (such as from 1″–2″ water column) to position and support the structural trusses 22 while they are being attached at their ends to the footings 80. When this attachment has been completed, the form cables 45 are loosened, allowing the form to press up against the chairs 62 used to space the trusses up off the form fabric. As the inflation pressure is increased to a value sufficient to support the weight of concrete to be applied, the form pre-tensions the light structural members of the truss as previously described, thus increasing the bending resistance of the truss so that it acts to resist bending distortion due to non-uniform loading under the weight of concrete and due to wind loads.

Figure 13:
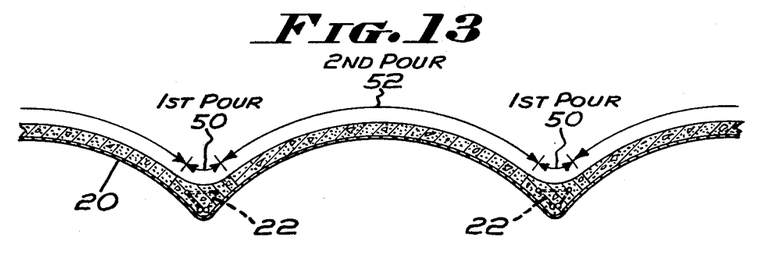
FIG. 13 is a section through a typical finished concrete arch constructed in accordance with the invention.

The concrete is so placed as to first build up the valley sections to combine with the trusses to form beam sections. Concrete is placed either by pouring or by gun. The sequence of the concrete placement is preferably planned so as to minimize the bending deflection of the form, prevent cracking in the fresh concrete and to give better compaction; such as by starting at the opposite lower ends and working up. Thus, concrete is first placed for each beam as indicated at 50 (FIG. 13) and is allowed to develop its initial "set" and strength before placing the concrete in the intermediate arch sections as indicated at 52. This insures that the reinforced concrete beams so produced are of sufficient strength to maintain their relative positions while the concrete for the intermediate arch section is being poured and has developed its initial set. The arch sections are placed in similar manner, by spraying or by laying the concrete as uniformly as possible with any suitable equipment. Reenforcing mesh can be used in the concrete shell as required by structural considerations. The form is kept inflated until the concrete has developed sufficient strength to be self supporting. The form is then removed, and any subsequent treatment of the concrete may be applied as required.

In order to form buildings of a length longer than that provided by the single form, after one section of the building has been formed and set, the form is easily removed by releasing the clips 70 and deflating and lowering the form to the ground. The form is then relocated to form a new section of arches, placing the form so that the end form section lies under the last concrete arch in order to lock the form to the previous shell and maintain proper alignment. The process may be repeated to provide successive shell sections.

It should be recognized that the details illustrated up to this point are of but one form of this invention. The structural truss 22 may be of a variety of shapes and construction as best suits the particular building design. Likewise, the design of the form at the ends, and the provision for attachment to the form, can vary in detail, the important consideration being only that the ends of the form be restrained so as to resist pressure loads and to maintain the prescribed shape of the form.

Figure 14:
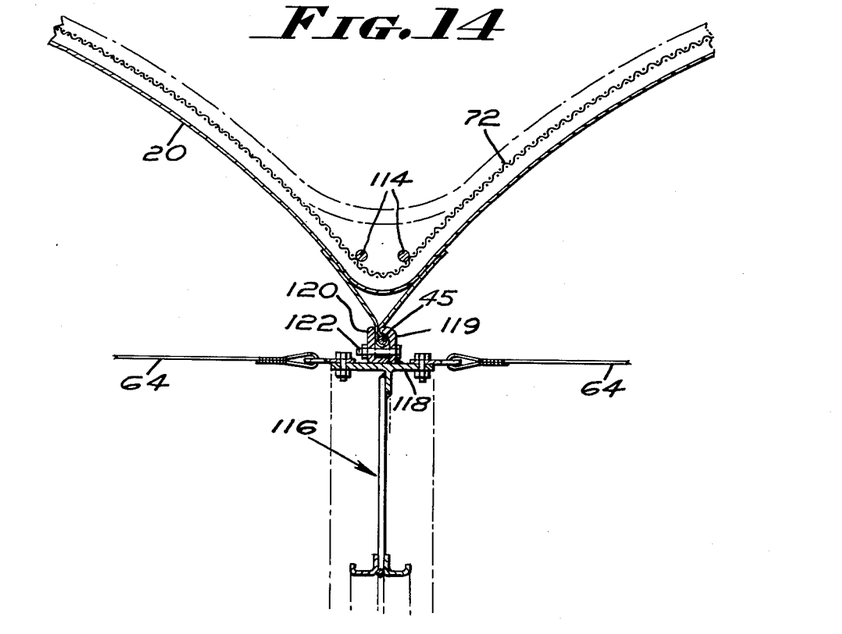
FIG. 14 is a fragmentary section corresponding to FIG. 6 but of a modified form of the construction.

Whereas the drawing and description up to this point illustrate the invention by way of example in a construction wherein the structural trusses are ultimately embodied in the beam sections of the poured concrete shell structure, it is to be understood that the trusses may be otherwise arranged to provide the requisite stabilizing support for the inflated envelope during the wet concrete support phase of the operation. For example, the trusses may be disposed interiorly of the envelope fabric instead of exteriorly thereof, and tied thereto by suitable devices to provide the valley formations in the envelope when inflated as shown in FIG. 14. In this case the support truss does not become an integral part of the concrete structure, and the latter is therefore preferably reinforced by suitably placed reinforcing rods 114 and/or reinforcing mesh as indicated at 72. Again, in such case the beam sections are preferably poured first and allowed to set up to provide rigid arch beam sections prior to placement of controls on the form fabric intermediately of the beams, as explained hereinabove. For example, as shown in FIG. 14 the trusses can be constructed as indicated at 116 to include top plates 118 carrying clamp flanges 119. Detachable locking plates 120 are arranged to be connected to the flanges 119 as by means of bolts 122, whereby the truss 116 may be gripped upon the cable 45 hereinabove referred to.

Figures 15, 16:
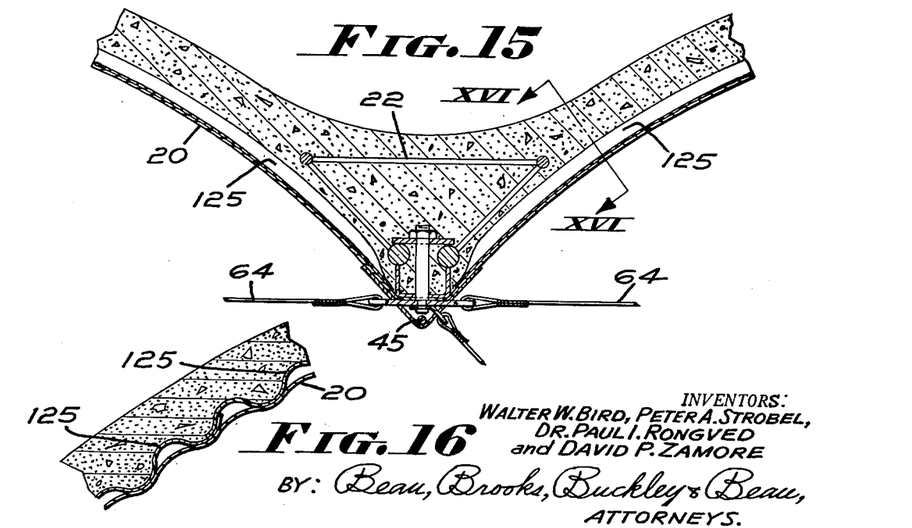
FIG. 15 is a view also corresponding to FIGS. 6 and 14 but showing a supplementary device of the invention.
FIG. 16 is a section taken on line XVI—XVI of FIG. 15.

FIGS. 15, 16 illustrate an accessory device that can be usefully applied in conjunction with the system of the present invention to provide improved stability of the arch sections and control of the surface form of the inside of the concrete shell when finished. As shown therein, pluralities of panels 125 can be loosely placed in any desired pattern arrangement on top of the envelope fabric to supplement the latter in determining the local surface texture of the finished concrete. For example, the panels 125 can be surface-embossed or curved or otherwise geometrically shaped so as to present to the wet concrete being poured the desired form surface; it being understood that the panels 125 are in any case supported by the fabric envelope in operative position without need for any complicated attachment devices. FIG. 16 specifically illustrates a typical corrugated panel type such as can be used to produce a corrugated surface texture as explained hereinabove. It will be apparent that the panels 125 also cooperate to further stabilize the arch sections of the form and prevent local distortions of the form surface, in addition to shaping the ceiling surface of the concrete shell. Such panels, or other pieces, can either lie removed when the form is deflated, or are arranged to be embedded in place in the finished concrete to become an integral ornamental surface portion of the concrete shell.

Figures 17, 18, 19, 20, 21:
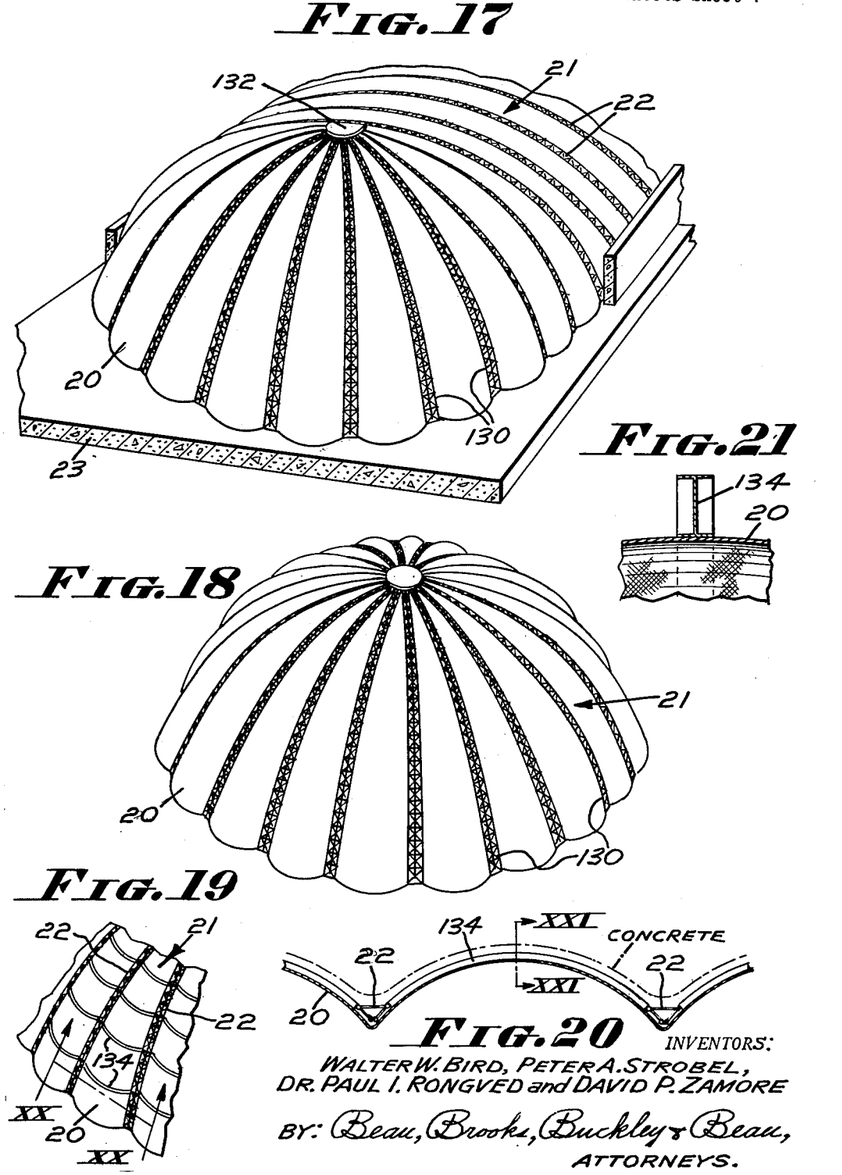
FIG. 17 is a perspective view of a frame-stabilized air-supported form similar to that shown in FIG. 1, but having a spherically shaped end section.
FIG. 18 is a perspective view illustrating the frame and form for a hemispherically-shaped building.
FIG. 19 is a fragmentary perspective view illustrating the use of transverse stiffeners.
FIG. 20 is a section on enlarged scale thru the form taken along line XX—XX of FIG. 19, illustrating the position of the transverse stiffener and showing the concrete in place.
FIG. 21 is a section thru the transverse stiffener taken along line XXI—XXI in FIG. 20.

FIG. 17 corresponds to FIG. 1 but illustrates another form of building construction that can be fabricated in accordance with the present invention. In this case the ends of the building are of generally hemispherical shape and include pluralities of trusses 130 (which are generally of the type of the girthwise trusses 22) extending radially from a central top connection point 132. Thus, in the case of FIG. 17 no stiffening beams such as indicated at 26 (FIG. 1) are required in connection with the flexible form fabric to stabilize it during the concrete pouring operation. FIG. 18 illustrates a full hemispherical shaped building constructed in accordance with the invention wherein the fabric envelope material is stabilized by trusses 130 and is thereby caused to assume the secondary arch configurations 21 as explained hereinabove. Thus, subsequent placement of concrete over this form results in the fabrication of a complementary-shaped shell-form concrete structure which integrally incorporates the reinforcing truss components 130.

FIGS. 19, 20, 21 illustrate still another modification of the form structure as illustrated and described hereinabove, wherein arch-shaped transverse stiffeners 134 are disposed at intervals transversely of the secondary arch sections 21 to extend between the trusses 22. By reason of this arrangement the fabric between the trusses 22 is further stabilized at appropriate intervals by the stiffeners 134, and the latter also act to relatively stabilize the trusses in their prescribed spaced relationships, and otherwise generally reinforce the envelope stabilizing system.

It will of course be appreciated that although only a few forms and details of the invention have been illustrated and described in detail, various changes may be made therein without departing from the spirit of the invention or the scope of the appended claims. For example, the building material placed on the form 20 need not be in settable form. In lieu thereof pre-cast concrete slabs might be used.

We claim:

1. The method for building concrete structures comprising shaping an envelope for inflation to a shape complementing the prescribed shape of the structure to be built, arranging a plurality of curved trusses at intervals along said envelope, inflating said envelope to cause it to bear against said trusses and to billow therebetween, thereby forming valleys at the regions of said trusses, placing concrete in said valleys to form ribs enclosing said trusses as reinforcement devices therein, and then subsequent to setting of the concrete of said ribs placing concrete on said envelope intermediately of said ribs to provide a continuous shell form concrete structure.

2. The method for building concrete structures comprising shaping an envelope for inflation to a shape defining a series of adjacent bands of arcuate cross section presenting valleys at the intersections of adjacent bands, anchoring a plurality of trusses at spaced intervals externally of said envelope, in which the spacing between trusses corresponds to the widths of said bands, inflating said envelope to cause it to bear at the valley thereof against said trusses, placing concrete on the envelope to form ribs in the valleys thereof enclosing said trusses as reinforcement devices therein and intermediately of said ribs to provide a continuous shell form concrete structure.

3. The method for building concrete structures comprising shaping an envelope for inflation to a shape complementing the prescribed shape of the structure to be built, arranging a plurality of curved trusses at intervals along said envelope externally thereof, relatively bracing said trusses, inflating said envelope to cause it to bear against said trusses and to billow therebetween thereby forming valleys at the regions of said trusses, placing concrete in said valleys to form beams including said trusses as reinforcement devices therein, and then subsequent to setting of the concrete of said beams placing concrete on said envelope intermediately of said beams to provide a continuous shell form concrete structure.

4. The method for building concrete structures comprising shaping an envelope for inflation to a shape generally complementing the prescribed shape of the structure to be built, arranging a plurality of curved trusses at intervals along said envelope externally thereof, inflating said envelope to cause it to bear against said trusses and to billow therebetween thereby forming valleys at the regions of said trusses, placing preshaped substantially rigid panels upon the envelope between said trusses, placing concrete in said valleys to form ribs and then subsequent to setting of the concrete of said ribs structurally integrating said panels to thereby provide a continuous shell form structure.

5. The method for building concrete structures comprising shaping an envelope for inflation to a shape complementing the prescribed shape of the structure to be built, arranging a plurality of curved trusses at intervals along said envelope internally thereof, attaching the envelope to said trusses, inflating said envelope to cause it to pull against said trusses and to billow therebetween thereby forming valleys at the regions of said trusses, placing concrete in said valleys to form concrete beam sections, and then subsequent to setting of said beam sections placing concrete on said envelope intermediately of said beam sections to provide a continuous shell form concrete structure.

6. The method of building concrete structures which comprises
shaping an envelope for inflation to a shape defining a series of adjacent bands of arcuate cross section presenting valleys at the intersections of adjacent bands and in which the bands are of arcuate longitudinal section,
inflating said envelope to rigidify the same,
further rigidifying said envelope throughout the valleys thereof,
still further rigidifying said envelope by applying concrete to and throughout said valleys thereof and permitting the same to harden,
and then completing the structure by applying concrete over the envelope to cover the remaining exposed portions of said bands.

7. The method of building concrete structures which comprises
inflating an envelope to a prescribed shape,
rigidifying said envelope by anchoring spaced transversely extending portions thereof to maintain valleys therealong,
further rigidifying said envelope by applying concrete within and throughout said valleys and allowing the same to harden,
and then applying concrete over the surface of said envelope to fill between said valleys.

References Cited in the file of this patent
UNITED STATES PATENTS

| 1,964,386 | Nose | June 26, 1934 |
| 2,308,806 | Davis | Jan. 19, 1943 |
| 2,324,554 | Billner | July 20, 1943 |
| 2,379,636 | Hedgren | July 3, 1945 |
| 2,550,627 | Walter | Apr. 24, 1951 |
| 2,705,360 | Leonhardt | Apr. 5, 1955 |
| 2,857,648 | March | Oct. 28, 1958 |
| 2,892,239 | Neff | June 30, 1959 |
| 2,948,047 | Peeler et al. | Aug. 9, 1960 |

UNITED STATES PATENT OFFICE
CERTIFICATE OF CORRECTION

Patent No. 3,139,464 June 30, 1964

Walter W. Bird et al.

It is hereby certified that error appears in the above numbered patent requiring correction and that the said Letters Patent should read as corrected below.

Column 6, line 15, for "controls" read -- concrete --.

Signed and sealed this 10th day of November 1964.

(SEAL)
Attest:

ERNEST W. SWIDER
Attesting Officer

EDWARD J. BRENNER
Commissioner of Patents